(12) United States Patent
Kim

(10) Patent No.: US 6,882,860 B1
(45) Date of Patent: Apr. 19, 2005

(54) METHOD FOR ISSUING A INCOMING CALL ALERT ACCORDING TO SERVICE OPTIONS IN A COMPOSITE CELLULAR TERMINAL

(75) Inventor: Kyou-Woong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/217,112

(22) Filed: Dec. 21, 1998

(30) Foreign Application Priority Data

Dec. 19, 1997 (KR) .................................. 1997-70432

(51) Int. Cl.⁷ .................. H04M 1/00; H04M 7/00; H04M 3/42; H04Q 7/20; H04L 9/00
(52) U.S. Cl. .................. 455/553.1; 455/422.1; 455/426.1; 455/434; 455/566; 455/567; 455/575.3; 379/67.1; 379/211.01; 379/373.01; 379/374.01; 379/375; 380/260
(58) Field of Search .................. 455/553.1, 575.3, 455/434, 422.1, 426.1, 566, 567, 466, 421, 436; 379/374.01, 211.01, 67.1, 373.01, 375; 380/266

(56) References Cited

U.S. PATENT DOCUMENTS

| 4,495,652 A | * | 1/1985 | Leslie |
| 4,962,524 A | * | 10/1990 | Murata et al. |
| 5,025,467 A | * | 6/1991 | Wheller ........................ 455/567 |
| 5,058,151 A | * | 10/1991 | Tanaka et al. |
| 5,303,284 A | * | 4/1994 | Shinozaki |
| 5,335,276 A | * | 8/1994 | Thompson et al. .......... 380/266 |
| 5,335,355 A | * | 8/1994 | Tanaka et al. ............. 455/553.1 |
| 5,452,354 A | * | 9/1995 | Kyronlahti et al. .......... 379/375 |
| 5,526,403 A | * | 6/1996 | Tam |
| 5,564,077 A | * | 10/1996 | Obayashi et al. ........... 455/553.1 |
| 5,640,682 A | * | 6/1997 | Wagai et al. |
| 5,715,524 A | * | 2/1998 | Jambhekar et al. ......... 455/575.3 |
| 5,784,693 A | * | 7/1998 | Barber et al. ............... 455/434 |
| 5,802,468 A | * | 9/1998 | Gallant et al. ............. 455/422.1 |
| 5,845,215 A | * | 12/1998 | Henry et al. .............. 455/426.1 |
| 5,946,636 A | * | 8/1999 | Uyeno et al. ............... 455/566 |
| 6,018,655 A | * | 1/2000 | Bartle et al. ............... 455/421 |
| 6,032,053 A | * | 2/2000 | Schroeder et al. ......... 455/553.1 |
| 6,134,455 A | * | 10/2000 | Corkum ..................... 455/567 |
| 6,157,836 A | * | 12/2000 | Cashman .................... 455/436 |
| 6,289,099 B1 | * | 9/2001 | Edgar, III .............. 379/374.01 |
| 6,363,144 B1 | * | 3/2002 | Becher et al. .......... 379/211.01 |
| 6,385,303 B1 | * | 5/2002 | Peterson et al. ........... 379/67.1 |
| 6,449,359 B1 | * | 9/2002 | Luzzatto et al. ........ 379/373.01 |

* cited by examiner

Primary Examiner—William D. Cumming
(74) Attorney, Agent, or Firm—Dilworth & Barrese, LLP

(57) ABSTRACT

A composite cellular terminal providing various service options issues different call termination alert tones and different call termination display messages according to types of terminated calls. The cellular terminal sets and stores the call termination alert tones and the call termination display messages according to those service options which are available for the composite cellular terminal. Upon reception of a paging message, If the terminal recognizes the service option contained within the paging message, the terminal then retreives a call termination alert tone corresponding to the recognized service option and generates the call termination alert tone. The terminal then retreives a call termination display message corresponding to the recognized service option and displays the read call termination display message. Service options may include a voice call service, an asynchronous data service, a facsimile service, a short message service, a packet data service and a CDPD (Cellular Digital Packet Data) service.

8 Claims, 5 Drawing Sheets

METHOD FOR ISSUING A INCOMING CALL ALERT ACCORDING TO SERVICE OPTIONS IN A COMPOSITE CELLULAR TERMINAL

BACKGROUND OF THE INVENTION

1. Field of the Invention

The present invention relates to composite cellular terminals, and more particularly, it relates to a method for issuing a call termination alert in a composite cellular terminal.

2. Description of the Related Art

With the progress of mobile communication technology, a cellular mobile communication terminal can provide data service as well as existing voice service. A cellular terminal which can provide a data service, such as a facsimile service, a short message service (SMS) and an internet service as well as a voice service, is referred to as a composite cellular terminal.

Existing cellular communication terminals, designed to provide only voice services, cannot provide data service features including call termination alert tones and call termination display messages. In addition, although personal information terminals such as the PDA (Personal Digital Assistant) do provide various data services, the same call termination alert tone is generated irrespective of the type of data service provided. This is undesirable in that the user may not audibly perceive the type of data service being originated from a base station.

SUMMARY OF THE INVENTION

It is therefore an object of the present invention to provide methods and an apparatus for generating different call termination alert tones according to service options in a composite cellular terminal.

It is another object of the present invention to provide methods and an apparatus for displaying different call termination display messages according to service options in a composite cellular terminal.

To achieve the above objects, there is provided methods and an apparatus for issuing different call termination alert tones and different call termination display messages according to the types of terminated calls in a composite cellular terminal providing various service options. In accordance with the method, the mobile cellular terminal sets and stores a unique call termination alert tone and call termination display message for each service option provided by the terminal. Upon receipt of a paging message, the mobile cellular terminal recognizes a service option contained within the message, and retrieves a call termination alert tone corresponding to the recognized service option, and generates the corresponding tone in response. Further, the mobile terminal retrieves and displays a call termination display message corresponding to the recognized service option. Recognized service options preferably include; a voice call service, an asynchronous data service, a facsimile service, a short message service, a packet data service and a CDPD service.

Call termination alert tones are set (i.e. initialized) as follows: upon receipt of a call termination alert tone setting key input from a user, the terminal, in response, will display a list of service options. The user will then select one of the listed service options via a key input. Next, the terminal displays a list of call termination alert tones. The user will then select one of the listed alert tones via a key input. Thereafter, the terminal associates the selected call termination alert tone to the selected service option and generates the selected call termination alert tone. Upon receipt of a confirmation key input from the user, the terminal then stores the selected call termination alert tone in association with the selected service option.

Call termination display messages are set (i.e. initialized) as follows: upon receipt of a call termination display message setting key input from a user, the terminal, in response, will display a list of service options. The user will then select one of the listed service options via a key input. Next, the terminal displays a prompt requesting a user to input a call termination display message. The terminal displays the call termination display message input by the user. Upon receipt of a confirmation key input from the user, the terminal stores the input call termination display message in association with the selected service option.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described hereinbelow with reference to the accompanying drawings. In the following description, well known functions or constructions are not described in detail so as not to obscure the invention in unnecessary detail.

Figure 1:
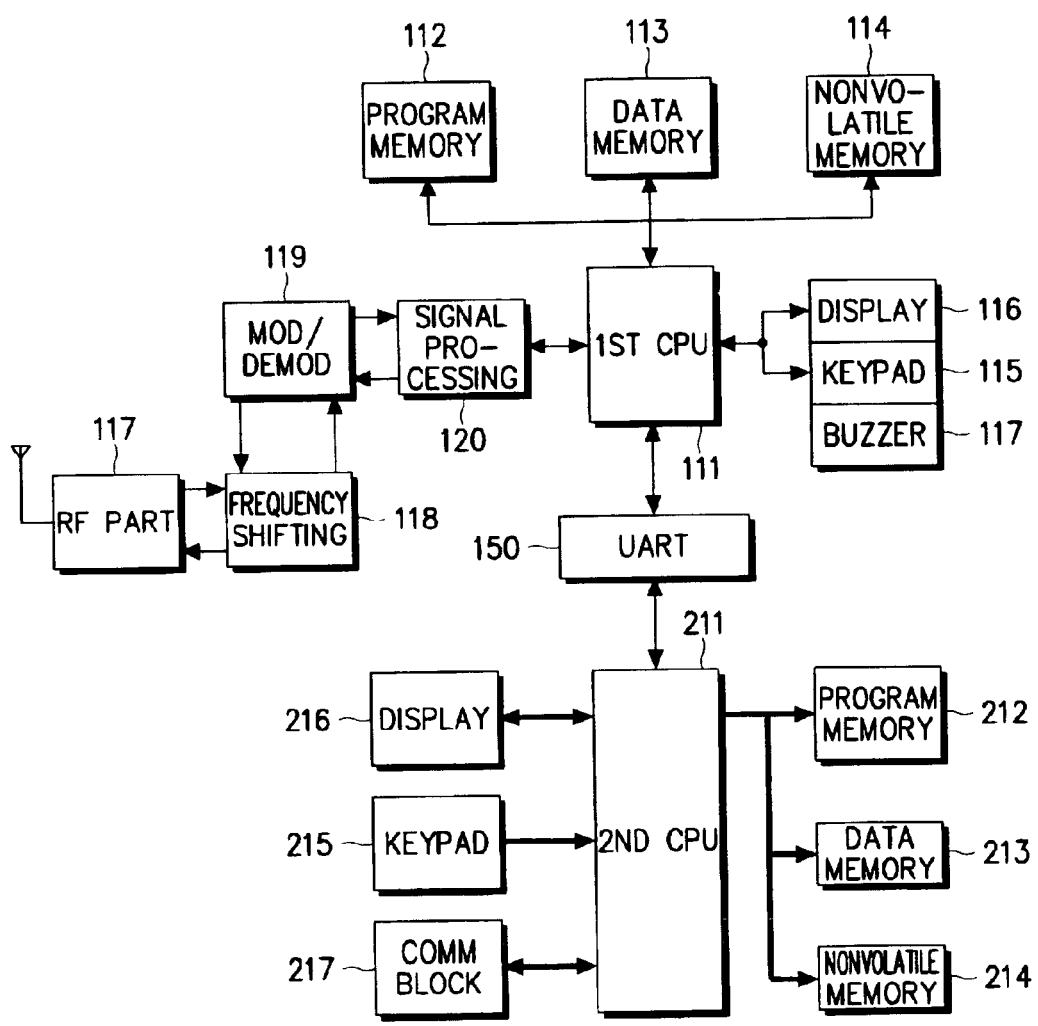
FIG. 1 is a block diagram of a composite cellular terminal in accordance with the present invention.

FIG. 1 is a block diagram of a composite cellular terminal in accordance with the present invention. As illustrated, the composite cellular terminal is divided into a mobile telephone section 100 and a PDA section 200.

Referring now to the mobile telephone section 100, a first CPU (Central Processing Unit) 111 controls the overall operations and performs data communication with the PDA section 200. A program memory 112, preferably a flash memory, stores a program for controlling the overall operations of the mobile telephone section. A data memory 113, preferably a RAM (Random Access Memory), temporarily stores data generated during operation of the mobile telephone section. A nonvolatile memory 114, preferably an EEPROM (Electrically Erasable and Programmable Read Only Memory), stores phone numbers for speed dialing and system parameters. A keypad 115 generates key commands for controlling operation of the first CPU 111 and key data for inputting data. A display 116, preferably an LCD (Liquid Crystal Display), displays status information generated during operation of the mobile telephone section, under the control of the first CPU 111. In particular, the display 116 displays different call termination display messages according to the types of the terminated calls. A buzzer 117 generates different call termination alert tones according to the types of the terminated calls, under the control of the first CPU 111.

A communication block 121 of the mobile telephone section 100 is composed of an RF (Radio Frequency) part 122, a frequency conversion (shifting) part 118, a modulation/demodulation part 119 and a signal processing part 120. The communication block is controlled by the first CPU 111. Though not depicted, the signal processing part 120 includes an interleaver, an encoder, a deinterleaver, a decoder, a vocoder and a PCM (Pulse Code Modulation) codec. In addition, detailed control signal lines of the first CPU 111, a voice signal processing circuit, a speaker and a microphone are omitted in FIG. 1, for clarity.

In a transmission mode, signal processing part 120 of communication block 121 encodes the transmission data. The modulation/demodulation part 119 modulates the coded transmission data, and the frequency conversion part 118 up-converts the modulated transmission signal to an RF transmission signal. Finally, the RF part 117 bandpass filters the RF transmission signal at a transmission frequency band, and amplifies the bandpass filtered signal and radiates it through an antenna.

In a reception mode, the RF part 122 low-noise amplifies a low power signal received through the antenna and bandpass filters the amplified signal at a reception frequency band. Then, the frequency conversion part 118 down-converts the received RF signal to a base band signal, the modulation/demodulation part 119 demodulates the base band signal, and the signal processing part 120 decodes the demodulated signal into the original signal.

Referring now to the PDA section 200, a second CPU 211 controls the overall operations of the PDA section 200 and performs data communication with the first CPU 111 of the mobile telephone section 100. A program memory 212, preferably a flash memory, stores a program for controlling the PDA section. A data memory 213, a RAM, temporarily stores data generated during operation of the PDA section 200, under the control of the second CPU 211. A nonvolatile memory 214, preferably an EEPROM, stores information to be registered in the PDA section and information input during data communication with the mobile telephone section 100. A keypad 215 generates key commands for controlling operation of the second CPU 211 and key data for inputting data. A display 216, an LCD, displays status information generated during operation of the PDA section, under the control of the second CPU 211. A communication block 217, a UART (Universal Asynchronous Receiver Transmitter), forms a data communication path to an external device.

In the composite cellular terminal, the mobile telephone section 100 may, for example, be a CDMA (Code Division Multiple Access) telephone and the PDA section 200 may, for example, be a hand PC (Personal Computer).

As illustrated in FIG. 1, the first CPU 111 of the mobile telephone section 100 communicates with the second CPU 211 of the PDA section 200 asynchronously at a preferable data rate of 57.6 Kbps by way of a UART 150. Here, an HDLC (High-level Data Link Control) message format is used. The UART 150 is an asynchronous receiver/transmitter available for both serial-to-parallel data conversion and parallel-to-serial data conversion. Through the UART 150, the PDA section may graphically process the user interface data input from the mobile telephone section.

The present invention is directed to generating different call termination alert tones and/or displaying different call termination display messages according to service options provided to the composite cellular terminal. By way of example, Table 1 illustrates CDMA service options specified by TIA/EIA TSB-58.

TABLE 1

| Service Option No. | Service Type |
|---|---|
| 1 | Voice Call Service |
| 4 | Asynchronous Data Service |
| 5 | G3 FAX Service |
| 6 | Short Message Service |
| 7 | Packet Data Service (Internet) |
| 8 | CDPD Service |

*where CDPD stands for Cellular Digital Packet Data

In a preferred embodiment, the call termination alert tones and the call termination display messages according to the service options are set by the manufacturer and then stored in the program memory 112.

Now, reference will be made to a method of setting the different call termination alert tones in accordance with the service options with reference to FIGS. 1 and 2. It is to be appreciated that the following steps may be performed either by an end user or as a manufacturing step.

Figure 2:
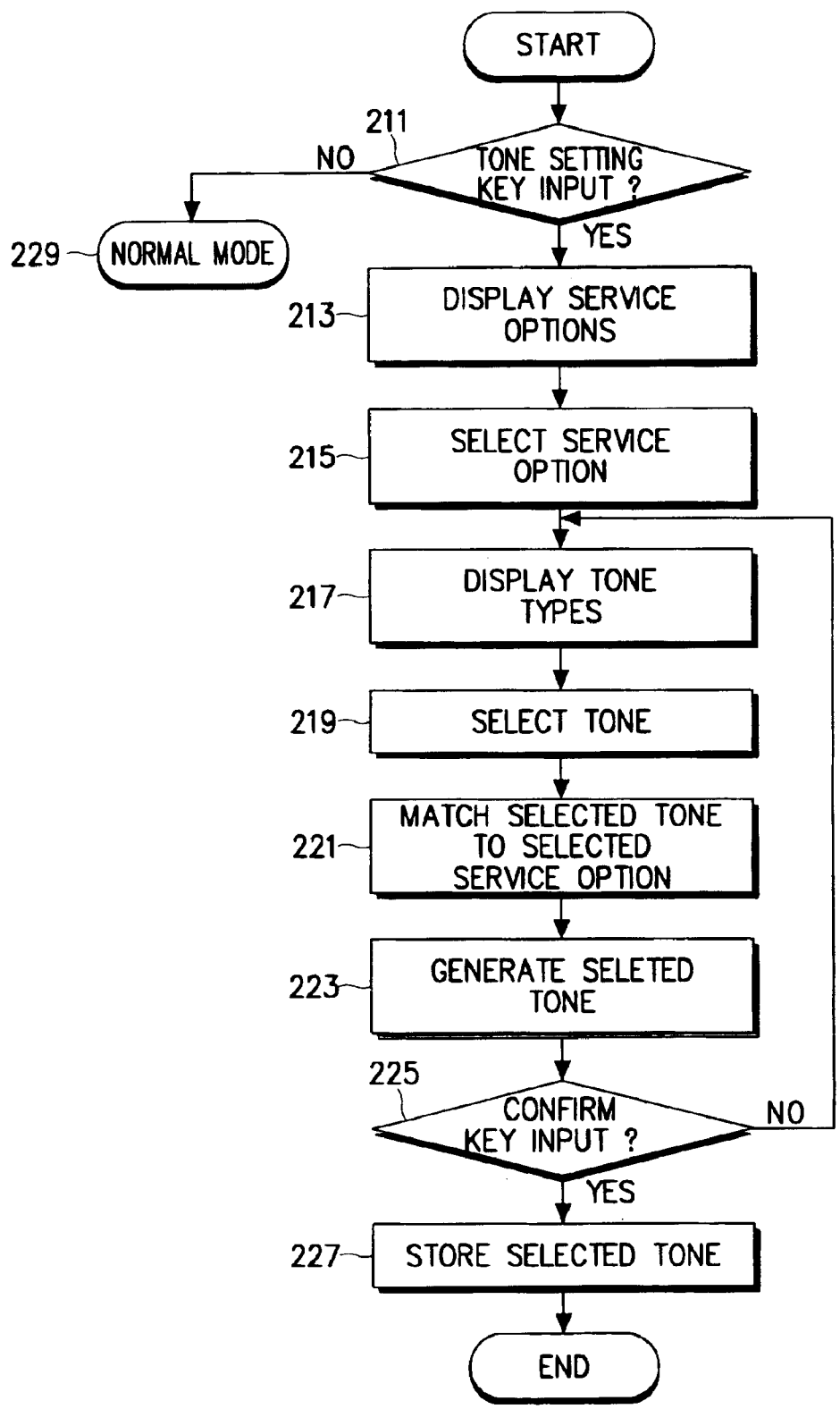
FIG. 2 is a flowchart illustrating the steps for setting different call termination alert tones in accordance with the provided service options.

FIG. 2 is a flowchart illustrating the steps for setting different call termination alert tones in accordance with the provided service options. In step 221, the first CPU 111 checks whether a call termination alert tone setting key input is received from the keypad 115. If a call termination alert tone setting key input is received, the process continues at step 223, otherwise, the process continues to a normal mode at step 239. Upon receipt of a call termination alert tone setting key input, the first CPU 111 displays, in step 223, the service options (See Table 1) on the display 116.

Upon viewing the various service options on the display, the user will choose one of the listed service options by inputting an associated service option number. The first CPU 111 then selects the service option corresponding to the user's key input, in step 225. Next, in step 227, the first CPU 11 displays a list of call termination alert tones together with an associated index on the display 116. The user will then choose one of the listed call termination alert tones by inputting an associated call termination alert tone number. In step 229, the first CPU 111 then selects the chosen call termination alert tone according to the user's key input. Thereafter, the first CPU 111 matches the selected call termination alert tone to the selected service option in step 231, and generates the selected call termination alert tone through the buzzer 117 in confirmation of the selected call termination alert tone, in step 233. Then, in step 235, the first CPU 111 checks whether the user has input a confirmation key. If a confirmation key input is received, the first CPU 111 proceeds to step 237 and stores the selected call termination alert tone in the non-volatile memory 114 in association with the selected service option. If, a confirmation key input is not received, the first CPU 111 otherwise returns to step 227 and re-displays the list of call termination alert tones.

Now, reference will be made to a method of setting the different call termination display messages according to the service options with reference to FIGS. 1 and 3. It is to be appreciated that the following steps may be performed either by an end user or as a manufacturing step.

Figure 3:
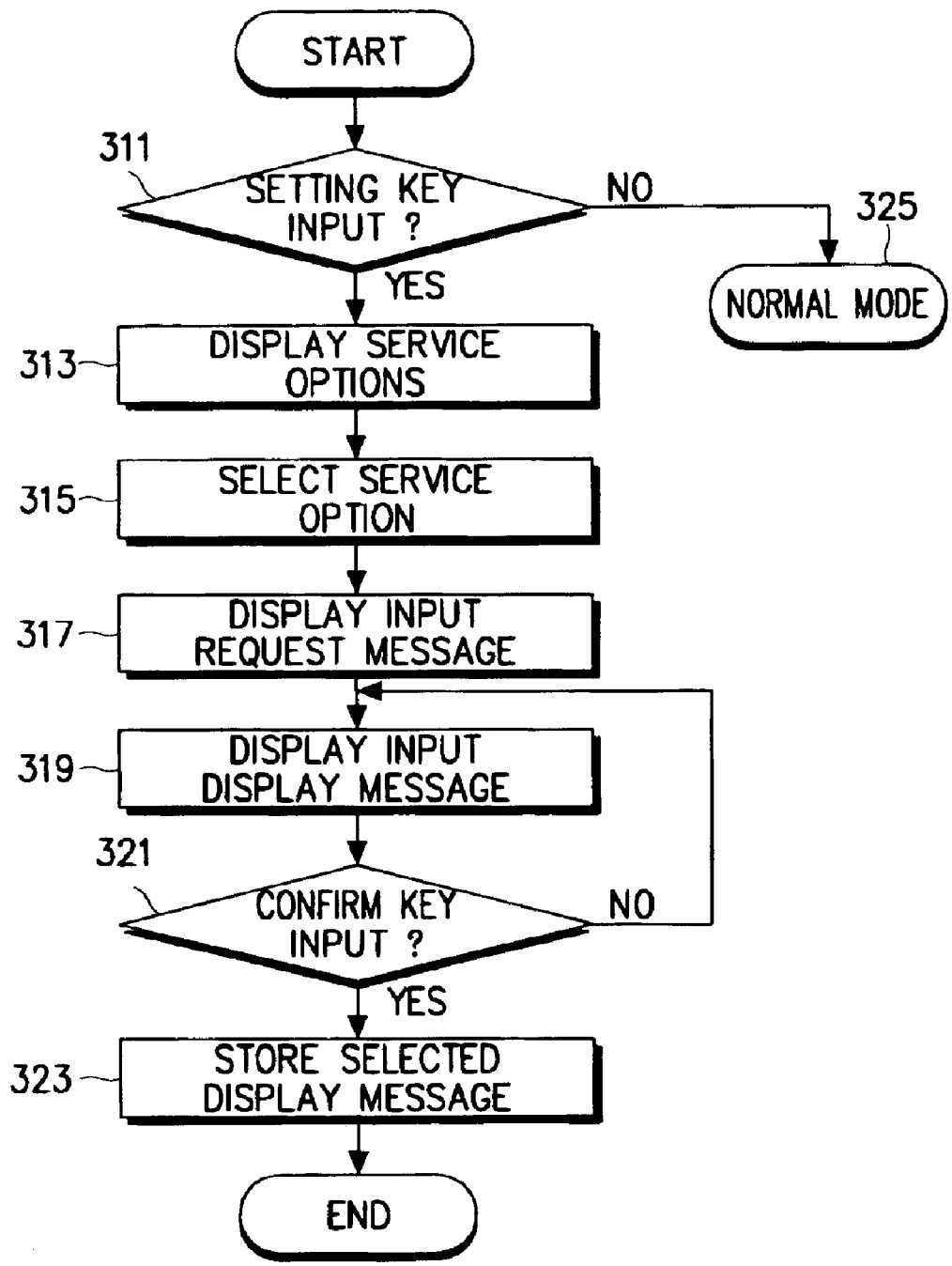
FIG. 3 is a flowchart illustrating the steps for setting different call termination display messages in accordance with the provided service options.

FIG. 3 is a flowchart illustrating the steps for setting call termination display messages in accordance with the various service options. At step 311, the first CPU 111 checks whether a display message setting key input is received from the keypad 115. If the display message setting key input is received, the process continues at step 313, otherwise, the process continues in a normal mode at step 325. In step 313, upon receipt of the display message setting key input, the first CPU 111 displays a list of service options (See Table 1) on the display 116.

Upon viewing the displayed service options, the user, via a key input, will choose one of the listed service options by inputting an associated service option number. The first CPU 111 then selects the service option chosen by the user in accordance with the user's key input, in step 315. The first CPU 111 then displays on the display 116 a message requesting the user to input an appropriate call termination display message, in step 317. Then, the user inputs a brief display message expressing the corresponding service option. As the user inputs the display message, the first CPU 111 displays the message on the display 116, in step 319. After displaying the call termination display message, the first CPU 111 checks, in step 321, whether the user has input a conformation key. If the confirmation key input is received, the first CPU 111 stores the call termination display message in the non-volatile memory 114 in association with the selected service option, in step 323. However, if a confirmation key input is not received, the first CPU 111 returns to step 319 and continues to display the display message input by the user.

Table 2 illustrates, by way of example, call termination alert tones and call termination display messages, which are set in accordance with the procedures of FIGS. 2 and 3. The table illustrates that, in general, not all service options will be made available to each composite cellular terminal. This is illustrated in the present example whereby service options 2 and 3 are not available.

TABLE 2

| Service Option No. | Call Termination Alert Tone No. | Display Message |
| --- | --- | --- |
| 1 | 4 | Voice Call |
| 4 | 6 | Circuit Call |
| 5 | 2 | FAX Call |
| 6 | 1 | SMS Call |
| 7 | 5 | Packet Call |
| 8 | 3 | CDPD Call |

Reference will now be made to a control procedure for issuing different call termination alert tones and/or different call termination display messages according to the service options, with reference to FIGS. 1, 4A and 4B.

Figure 4A:
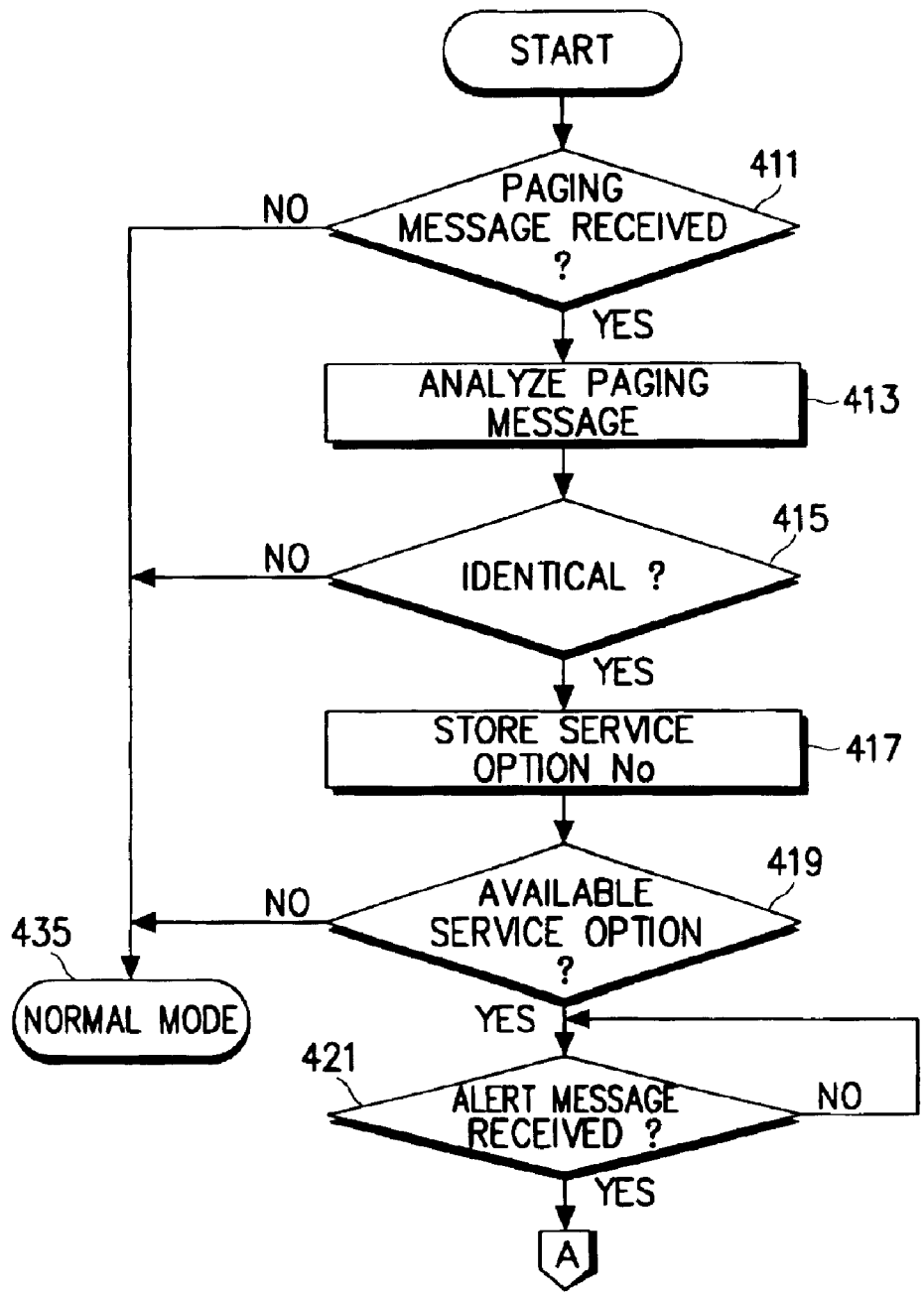
FIG. 4 is a flowchart illustrating a procedure for issuing different call termination alert tones and different call termination display messages according to the service options.
Figure 4B:
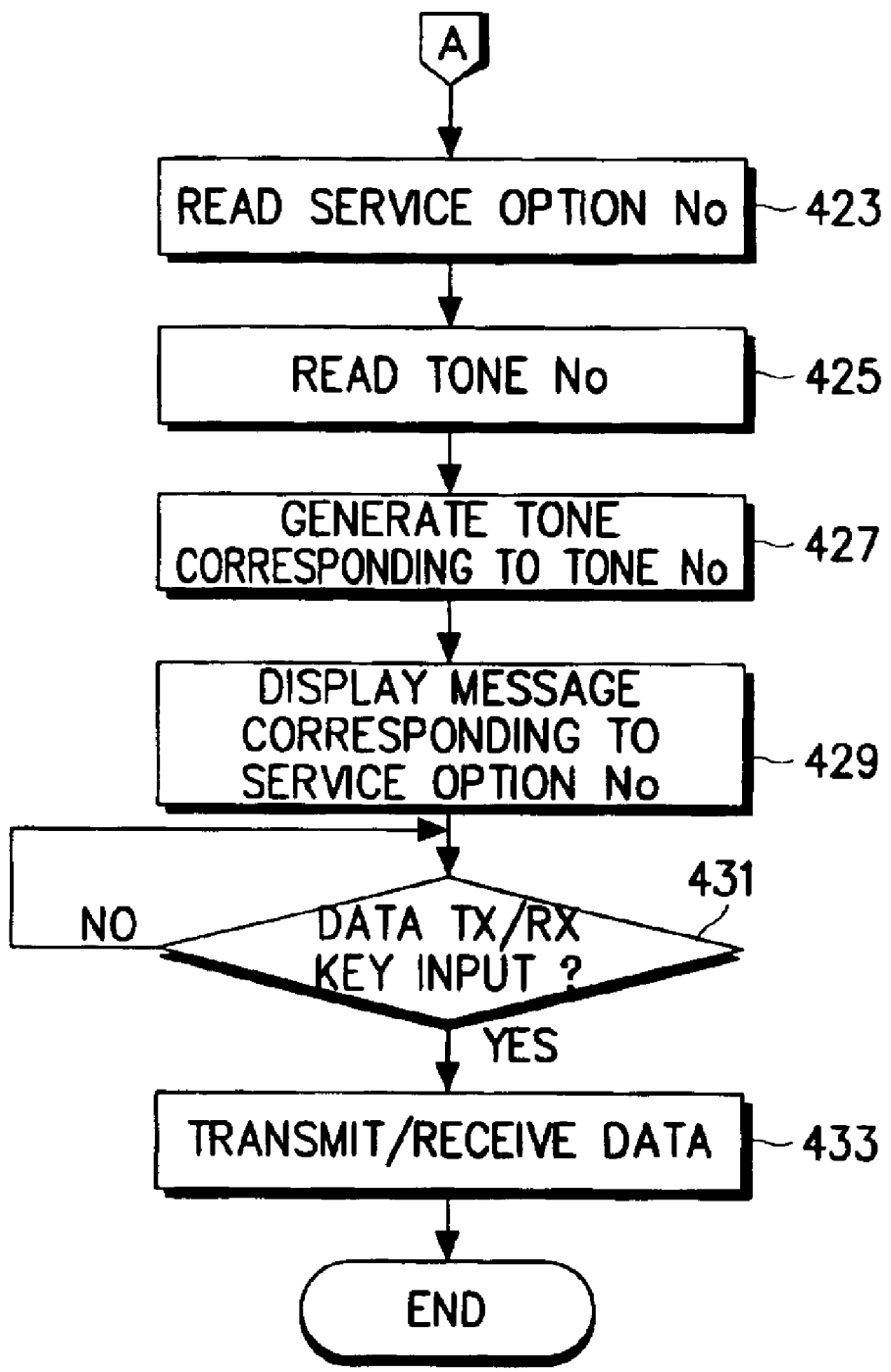

Referring to FIGS. 1, 4A and 4B, at step 411, the first CPU 111 checks whether a paging message is received from the base station through the antenna. When a paging message is received, the process continues to step 413, otherwise, the process continues to a normal mode at step 435. At step 413, upon receipt of a paging message, the first CPU 111 analyzes the received paging message to extract a telephone number and a serial number of the composite cellular terminal from the received paging message. At step 415, the first CPU 111 determines whether the extracted telephone number and serial number are identical to those stored in the terminals non-volatile memory 114, so as to determine whether the received paging message is directed to the composite cellular terminal. When the extracted telephone number and serial number are identical to those stored in the non-volatile memory 114, the process continues to step 417, otherwise, the process continues to the normal mode at step 435. In step 417, the first CPU 111 stores the service option number recognized from the paging message in the data memory 113. Thereafter, the first CPU 111 checks, in step 419, whether the composite cellular terminal can provide the recognized service option or not, through negotiation with the base station. Here, if it is possible to provide the recognized service option, the process continues to step 421, otherwise, the process continues at step 435 to perform the normal mode. In step 421, the first CPU 111 checks whether an alert message is received from the base station. If an alert message is received from the base station, the process continues to step 423, otherwise, the process continues to check whether an alert message has been received. In step 423, the first CPU 111 reads the service option number stored in the data memory 113, and then issues the call termination alert tone and the call termination display message corresponding to the read service option number in the succeeding steps.

Specifically, after reading the service option number, the first CPU 111 reads the call termination alert tone number corresponding to the service option number from the program memory 112, in step 425. Subsequently, in step 427, the first CPU 111 reads the call termination alert tone corresponding to the call termination alert tone number from the non-volatile memory 114 and generates the read call termination alert tone through the buzzer 117. Thereafter, in step 429, the first CPU 111 reads the call termination display message corresponding to the service option number from the program memory 112 and displays the read display message on the display 116. Then, at the sound of the call termination alert tone, the user will check the service option through the display 116 and input a specific key to transmit/receive data according to the service option. The first CPU 111 then checks in step 431 whether the specific key for the data transmission/reception is input or not. Here, if the specific key is input, the first CPU 111 goes to step 433 to transmit/receive the data, and otherwise, continues to check whether the specific key is input or not.

Although the composite cellular terminal transmits the data in response to the specific key input by the user in this embodiment, it can be understood that it can automatically transmit the data in answer to the call termination.

As described above, upon reception of a call incoming from the base station, the composite cellular terminal of the invention generates different call termination alert tones according to the service options, so that the user may easily perceive the type of the terminated call by ear. In addition, the composite cellular terminal displays different call termination display messages according to the service options, so that the user may easily perceive the type of the terminated call visually.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a unique incoming call alert tone responsive to a received call in a composite cellular terminal providing at least two service options available via a cellular system, the method comprising the steps of:

displaying a list of said at least two service options upon reception of an incoming call alert tone setting key input;

selecting one of the displayed at least two service options in response to a user's key input;

displaying a list of incoming call alert tones;

selecting one of the displayed incoming call alert tones in response to a user's key input;

matching the selected incoming call alert tone to the selected service option;

generating the selected incoming call alert tone;

storing the incoming call alert tone in association with the selected service option upon the entry of a confirmation key;

recognizing a service option from a paging message received over the cellular system;

retrieving an incoming call alert tone corresponding to the recognized service option; and generating the retrieved incoming call alert tone.

2. The method as claimed in claim 1, wherein said service options comprise a voice call service, an asynchronous data service, a facsimile service, a short message service, a packet data service and a CDPD (Cellular Digital Packet Data) service.

3. A method for displaying a unique incoming call display message responsive to a received call in a composite cellular terminal providing at least two service options available via a cellular system, the method comprising the steps of:

displaying said at least two service options upon receipt of an incoming call;

selecting one of the service options in response to a user's key input;

displaying a message requesting a user to input an incoming call display message;

displaying an incoming call display message input by the user;

storing the input incoming call display message in association with the selected service option upon entry of a confirmation key;

determining whether the received paging message is for the composite cellular terminal;

recognizing a service option from the paging message received over the cellular system when the received paging message is for the composite cellular terminal;

retrieving an incoming call display message corresponding to the recognized service option; and displaying the incoming call display message.

4. The method as claimed in claim 3, wherein said service options comprise a voice call service, an asynchronous data service, a facsimile service, a short message service, a packet data service and a CDPD service.

5. A method for issuing a unique incoming call alert tone and a unique incoming call display message according to types of terminated calls in a composite cellular terminal providing at least two service options available via a cellular system, the method comprising the steps of:

displaying a list of said one or more service options upon reception of an incoming call alert tone setting key input;

selecting one of the displayed one or more service options in response to a user's key input;

displaying a list of incoming call alert tones;

selecting one of the displayed incoming call alert tones in response to a user's key input;

matching the selected incoming call alert tone to the selected service option;

generating the selected incoming call alert tone;

storing the selected incoming call alert tone in association with the selected service option upon receipt of a confirmation key input;

setting and storing a unique incoming call display message for each of said provided one or more service options;

recognizing a service option from a paging message received over the cellular system;

retrieving an incoming call alert tone corresponding to the recognized service option;

generating the retrieved incoming call alert tone;

retrieving an incoming call display message corresponding to the recognized service option; and displaying the incoming call display message.

6. A method for issuing a unique incoming call alert tone and a unique incoming call display message according to types of terminated calls in a composite cellular terminal providing at least two service options available via a cellular system, the method comprising the steps of:

displaying said one or more service options upon reception of an incoming call;

selecting one of the service options in response to a user's key input;

displaying a message requesting a user to input an incoming call display message;

displaying an incoming call display message input by the user; and storing the input incoming call display message in association with the selected service option upon reception if a confirmation key;

setting and storing a unique incoming call alert tone for each of said provided at least two service options;

recognizing a service option from a paging message received over the cellular system;

retrieving an incoming call alert tone corresponding to the recognized service option;

generating the retrieved incoming call alert tone;

retrieving an incoming call display message corresponding to the recognized service option; and displaying the incoming call display message.

7. The method as claimed in claim 5, wherein said service options comprise a voice call service, an asynchronous data service, a facsimile service, a short message service, a packet data service and a CDPD service.

8. The method as claimed in claim 6, wherein said service options comprise a voice call service, an asynchronous data service, a facsimile service, a short message service, a packet data service and a CDPD service.

* * * * *